(12) United States Patent
Zhang et al.

(10) Patent No.: US 10,902,174 B1
(45) Date of Patent: Jan. 26, 2021

(54) POWER AND GROUND MESH MODELING FOR PLACEMENT IN CIRCUIT DESIGN

(71) Applicant: Cadence Design Systems, Inc., San Jose, CA (US)

(72) Inventors: Xincheng Zhang, Shanghai (CN); Jian An, Shanghai (CN); Fangfang Li, Shanghai (CN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/572,377

(22) Filed: Sep. 16, 2019

(51) Int. Cl.
 *G06F 30/392* (2020.01)
 *G06F 30/394* (2020.01)
 *G06F 119/06* (2020.01)

(52) U.S. Cl.
 CPC .......... *G06F 30/392* (2020.01); *G06F 30/394* (2020.01); *G06F 2119/06* (2020.01)

(58) Field of Classification Search
 CPC .. G06F 30/392; G06F 30/394; G06F 2119/06; G06F 119/06
 See application file for complete search history.

(56) References Cited

U.S. PATENT DOCUMENTS

| | | | |
|---|---|---|---|
| 8,473,891 B1* | 6/2013 | Bosshart | G06F 30/392 716/139 |
| 2013/0125078 A1* | 5/2013 | Bosshart | G06F 30/394 716/126 |

\* cited by examiner

*Primary Examiner* — Vuthe Siek
(74) *Attorney, Agent, or Firm* — Schwegman Lundberg & Woessner, P.A.

(57) ABSTRACT

Various embodiments provide for modeling a power and ground (PG) mesh for a circuit design placement process. For some embodiments, a reference PG mesh can be used to generate a PG mesh model for a circuit design. A PG mesh model can be generated for a circuit design by calculating how much routing resource is occupied by the reference PG mesh of the circuit design, and the resulting PG mesh model can be applied to the circuit design by removing a similar amount of routing resource from the circuit design during a placement circuit design flow. Additionally (or alternatively), a PG mesh model can be generated to comprise a set of metal obstructions that correspond to each macro of the circuit design, and the PG mesh model can be applied to the circuit design by adding the metal obstructions to one or more metal layers of the circuit design.

20 Claims, 8 Drawing Sheets

POWER AND GROUND MESH MODELING FOR PLACEMENT IN CIRCUIT DESIGN

TECHNICAL FIELD

Embodiments described herein relate to circuit design and, more particularly, to systems, methods, devices, and instructions for modeling a power and ground (PG) mesh for a circuit design placement process, which may be part of electronic design automation (EDA).

BACKGROUND

Electronic design automation (EDA) software systems commonly generate a power and ground (PG) mesh to supply power for both standard cells and macros within a circuit design. PG mesh types are created differently per technology process and custom design requirements of an EDA user (e.g., the metal stripe width and spacing of the PG mesh are different for different technology processes). In order to achieve a smaller voltage drop (e.g., IR drop), a EDA user usually has to add a dense PG mesh to a circuit design. This may be common for circuit designs relating to memories and macro intellectual property (IP), which need denser PG mesh than standard cell areas of a circuit design.

For traditional physical circuit design flow, the PG mesh is generated and added to a circuit design after standard cells and macros are placed (by a placement process of an EDA) within the circuit design. Usually, this is because some macros contain their own PG mesh and, as such, the distribution of each power stripe of the PG mesh may not be known until placement of the macros are fixed. Unfortunately, because a PG mesh occupies routing resources within a circuit design, waiting to generate and add the PG mesh until after placement of macros/standard cells can result in increased routing congestion (within the circuit design) for later circuit design stages. Additionally, resolving this routing congestion in later circuit design stages (e.g., by moving placement of standard cells) can be difficult, given that the macros are generally fixed in place by the placement process.

BRIEF DESCRIPTION OF THE DRAWINGS

Various ones of the appended drawings merely illustrate various embodiments of the present disclosure and should not be considered as limiting its scope.

DETAILED DESCRIPTION

Various embodiments provide for modeling a power and ground (PG) mesh for a circuit design placement process (hereafter, placement process). For some embodiments, a reference PG mesh (e.g., generated using an EDA customer's PG routing script) can be used to generate (e.g., extract) a PG mesh model for a circuit design. By using the reference PG mesh, various embodiments can generate a PG mesh model that efficiently and accurately mimics the real PG mesh that will eventually be generated and added to the circuit design (e.g., after a placement process). According to some embodiments described herein, a PG mesh model can be generated for a circuit design by calculating (e.g., estimating based on the reference PG mesh) how much routing resource is occupied by a PG mesh (e.g., the reference PG mesh) of the circuit design, and the resulting PG mesh model can be applied to the circuit design by removing a similar amount of routing resource from the circuit design during a placement circuit design flow (e.g., removed prior to a placement process being performed on the circuit design during the placement circuit design flow). Additionally (or alternatively), a PG mesh model can be generated to comprise a set of metal obstructions that correspond to each macro of the circuit design, and the PG mesh model can be applied to the circuit design by adding the metal obstructions to one or more metal layers of the circuit design (e.g., metal obstructions defined in the macro). Each macro obstruction can have a certain width and pitch to mimic the real PG mesh that will eventually be generated and added to the circuit design.

According to some embodiments, power and ground (PG) mesh modeling is used with a placement circuit design flow (hereafter, placement flow) that places a standard cell, a macro, or both within a circuit design. For some embodiments, the placement flow comprises a mixed-placement circuit design flow (hereafter, mixed-placement flow) that can place macros and standard cells of circuit design concurrently. By use of various embodiments, a placement flow (e.g., mixed-placement flow) can estimate routing congestion more accurately than before, which in turn can assist the placement flow in avoiding routing congestion getting worse after the real PG mesh is generated for the circuit design. In particular, some embodiments can reduce the same routing source in the area where the real PG mesh will occupy in a following circuit design stage. Additionally, various embodiments can help improve congestion correlation before and after a mixed-placement flow, and can also assist in avoiding congestion and quality-of-result (QoR) jump in a later placement and pre-CTS optimization process (e.g., a later seed mode placement and pre-CTS optimization).

In the initial stages of some embodiments, data describing a reference PG mesh is accessed, which can be used to model the PG mesh. Depending on the embodiment, the reference PG mesh can be one generated by using a script (e.g., a circuit design customer has their own PG routing script to generate a custom PG mesh). Various embodiments described herein can use multiple approaches to model PG mesh in the placement flow (e.g., mixed-placement flow) that places standard cells or macros of a circuit design without a PG mesh.

One approach to model a PG mesh for a placement process can comprise removing a routing resource (e.g., a partial routing resource) for one or more metal layers of a circuit design prior to a placement process (of the placement flow) being performed on the circuit design. Routing resource above and below each macro and standard cell may be removed. Additionally, routing resources can be removed uniformly for both macros and standards cells. Accordingly, this approach of modeling (i.e., removal of routing resources) can be used in the placement flow of a circuit design whose PG mesh is expected to be uniform for both macros and standard cells of the circuit design.

After removal of the routing resource for the one or more metal layers, the placement process (e.g., mixed-placement process) can estimate the routing congestion by calculating the routing resource overflow of each bin (e.g., grid cell) of a floorplan of the circuit design. The overflow calculation function can comprise: calculating a routing track utilization ratio (ratio) for a metal layer of a circuit design based on the reference PG mesh; and determining the overflow as:

$$\text{demand\_route\_tracks} - (1-\text{ratio}) \times \text{supply\_route\_tracks},$$

where demand_route_tracks represents routing tracks demanded by a bin based on current placement of macros or standard cell in the metal layer, and supply_route_tracks represents the supply of routing tracks available in the bin prior to any macro or standard cell placement.

For some embodiments, the utilization ratio (ratio) is calculated as follows:

$$=\text{SUM(PG\_blocked\_track\_length)} \times \text{Total\_track\_length},$$

where SUM(PG_blocked_track_length) represents the total length of routing tracks that are being utilized (e.g., blocked or occupied) by a power and ground mesh (e.g., the reference power and ground mesh), and Total_track_length represents the total length of routing tracks available for use prior to any macro or standard cell placement.

For various embodiments, a set of ratios is calculated for a circuit design, and that set of ratios is passed to a placement process (e.g., performed by a placer component of an EDA) to facilitate accurate routing congestion estimation by the placement process as described herein. The set of ratios can be expressed (e.g., as part of PG mesh model data) as a set of percentages, where each percentage is associated with a different metal layer of a circuit design and represents an amount of supplied tracks of the metal layer occupied by the PG mesh model. For example, the following data can express that 7% of supplied routing tracks on metal layer M1, 15% of supplied routing tracks on metal layer M2, 2% of supplied routing tracks on metal layer M3, and 2% of supplied routing tracks on metal layer M4 are occupied/blocked by the PG mesh model:

{M1 0.07 M2 0.15 M3 0.02 M4 0.02}.

Upon receiving this data, a placement process can consider this amount of routing resources on each metal layer removed, blocked, or otherwise unavailable, which the placement process can take into consideration when estimating routing congestion during placement of standard cells, macros, or both of a circuit design (as discussed herein).

Once the placement process is complete (e.g., the macro placement is fixed), the application of a PG mesh model to the circuit design can be removed or reserved prior to the real PG mesh being generated and added to the circuit design. For instance, where the PG mesh model comprises removal of routing resources from the circuit design (e.g., rendering routing tracks blocked or unavailable), removal/reversal of the application of the PG mesh model can comprise reversing the removal of the routing resources (e.g., rendering routing tracks unblocked or available).

A second approach to model the PG mesh for a placement process can comprise mimicking the PG mesh for standard cells and macros differently. For instance, circuit designs can have different PG mesh types between standard cells and macros, and uniformly removing routing resources (e.g., routing tracks) may not be accurate to estimate routing congestion that may be caused by a PG mesh eventually generated. Accordingly, for some embodiments, a PG mesh model for standard cells comprises removal of routing resources (e.g., routing tracks) prior to a placement process being performed on the circuit design and the placement process estimating routing congestion as described herein (e.g., using the overflow calculation function). In contrast, the PG mesh model for macros can comprise a set of metal cell obstructions (hereafter, metal obstructions) that each corresponds to (e.g., follows the position of) a macro of the circuit design and that can be applied (e.g., added) to the circuit design prior to the placement process being performed on the circuit design. The occupied routing tracks above each macro can be consistent with either the reference PG mesh or a metal obstruction and, in doing so, various embodiments can count how many sets of metal obstructions are needed to be added in each macro. Once the placement process is complete (e.g., the macro placement is fixed), the application of the PG mesh model for the macros can be removed by removing the set of metal obstructions from the circuit design prior to the real PG mesh being generated and added to the circuit design. The following represents an example of adding metal obstructions to a circuit design in an example EDA:

set_macro_place_constraint -cells {ram_256×16A rom_512×16A}-cell_obs {{M4 0.5 0.7}{M5 0.6 0.5}}, where each of ram_256×16A and rom_512×16A represents two different macros of the circuit design, the metal obstructions on metal layer M4 that correspond to the position of each of the macros has a width of 0.5 and a pitch (spacing) of 0.7, and the metal obstructions on metal layer M5 that correspond to the position of each of the macros has a width of 0.6 and a pitch of 0.5.

As used herein, a power and ground (PG) mesh can comprise a power and ground network of a circuit design that is arranged in a mesh-like structure or arrangement. A PG mesh can be used in a circuit design to supply power for both standard cells and macros of the circuit design.

Reference will now be made in detail to embodiments of the present disclosure, examples of which are illustrated in the appended drawings. The present disclosure may, however, be embodied in many different forms and should not be construed as being limited to the embodiments set forth herein.

Figure 1:
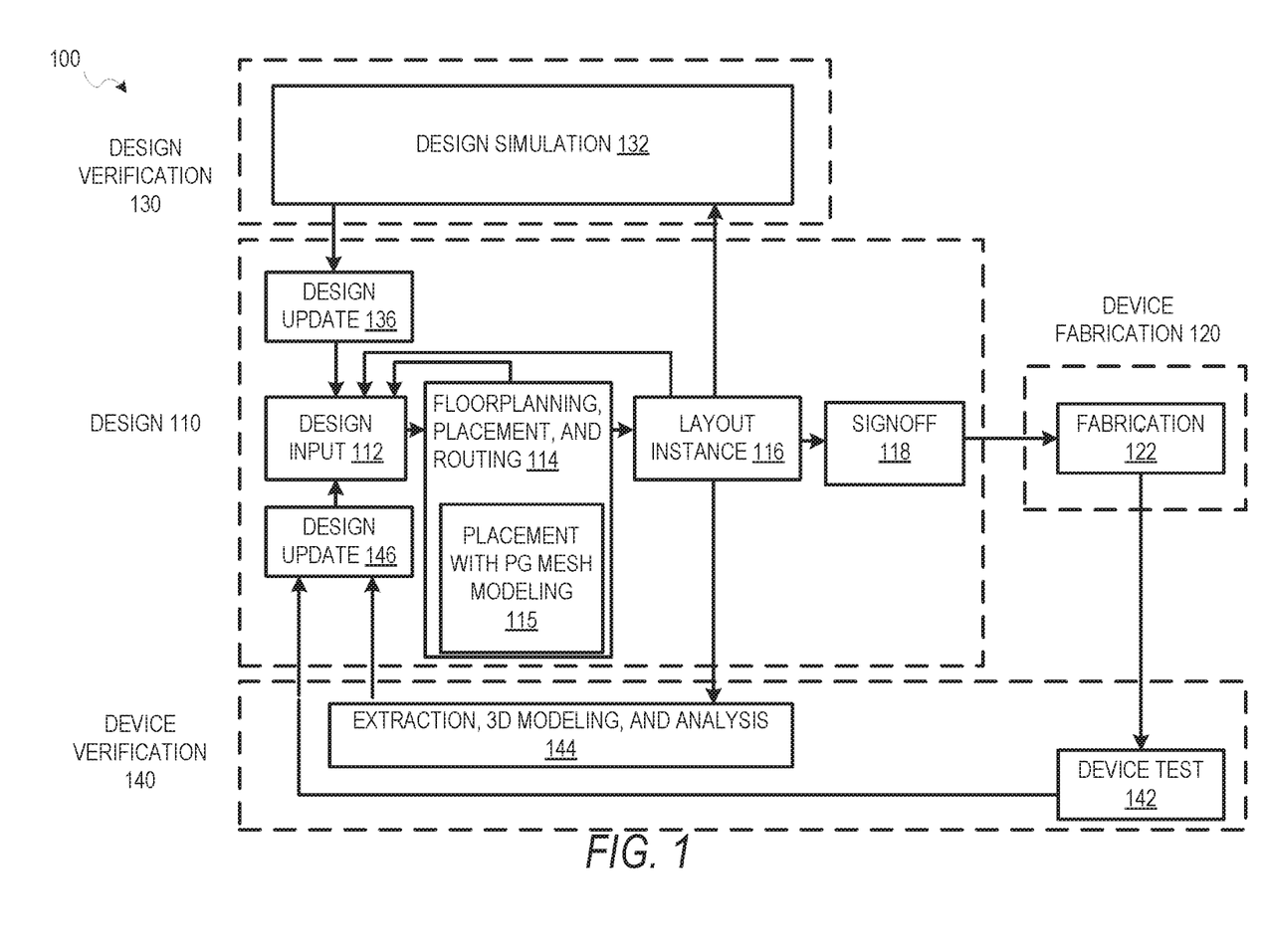
FIG. 1 is a diagram illustrating an example design process flow for placement with PG mesh modeling, according to some embodiments.

FIG. 1 is a diagram illustrating an example design process flow 100 for placement with PG mesh modeling, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, floorplanning, placement, and routing are performed in a floorplanning, placement, and routing 114 operation, along with any other automated design processes. The floorplanning, placement, and routing 114 operation may also include other operations not shown, such as those relating to timing analysis, routing optimization, post-placement optimization, and post-routing optimization. As shown, the floorplanning, placement, and routing 114 operation includes a placement process with power and ground (PG) mesh modeling 115 operation (hereafter, the placement with PG mesh modeling 115 operation), which may be performed in accordance with various embodiments described herein. For some embodiments, the placement with PG mesh modeling 115 operation can be performed prior to detailed routing of a circuit design.

While the design process flow 100 shows optimization occurring prior to a layout instance 116, timing analysis and optimization may be performed at any time to verify operation of a circuit design. For instance, in various embodiments, timing analysis in a circuit design may be performed prior to routing of connections in the circuit design; after routing, during register transfer level (RTL) operations; or as part of a signoff 118, as described below.

Design inputs are used in the design input 112 operation to generate an initial circuit layout. The design inputs may be further processed during the design input 112 operation via a process, such as logic-synthesis to generate a circuit netlist mapped to a target standard library manufacturable by the foundry in fabrication 122 operation. After design inputs are used in the design input 112 operation to generate an initial circuit layout, and any of the floorplanning, placement, and routing 114 operations are performed, a resulting layout is generated as the layout instance 116. The netlist as placed by the layout instance 116 describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations and layout modifications generated based on actual device performance.

As described in more detail below, a design update 136 from the design simulation 132 operations; a design update 146 from the device test 142 operations or the extraction, 3D modeling, and analysis 144 operations; or the design input 112 operation may occur after the initial layout instance 116 is generated. In various embodiments, whenever design inputs are used to update or change an aspect of a circuit design, a timing analysis and the floorplanning, placement, and routing 114 operation may be performed.

Figure 2:
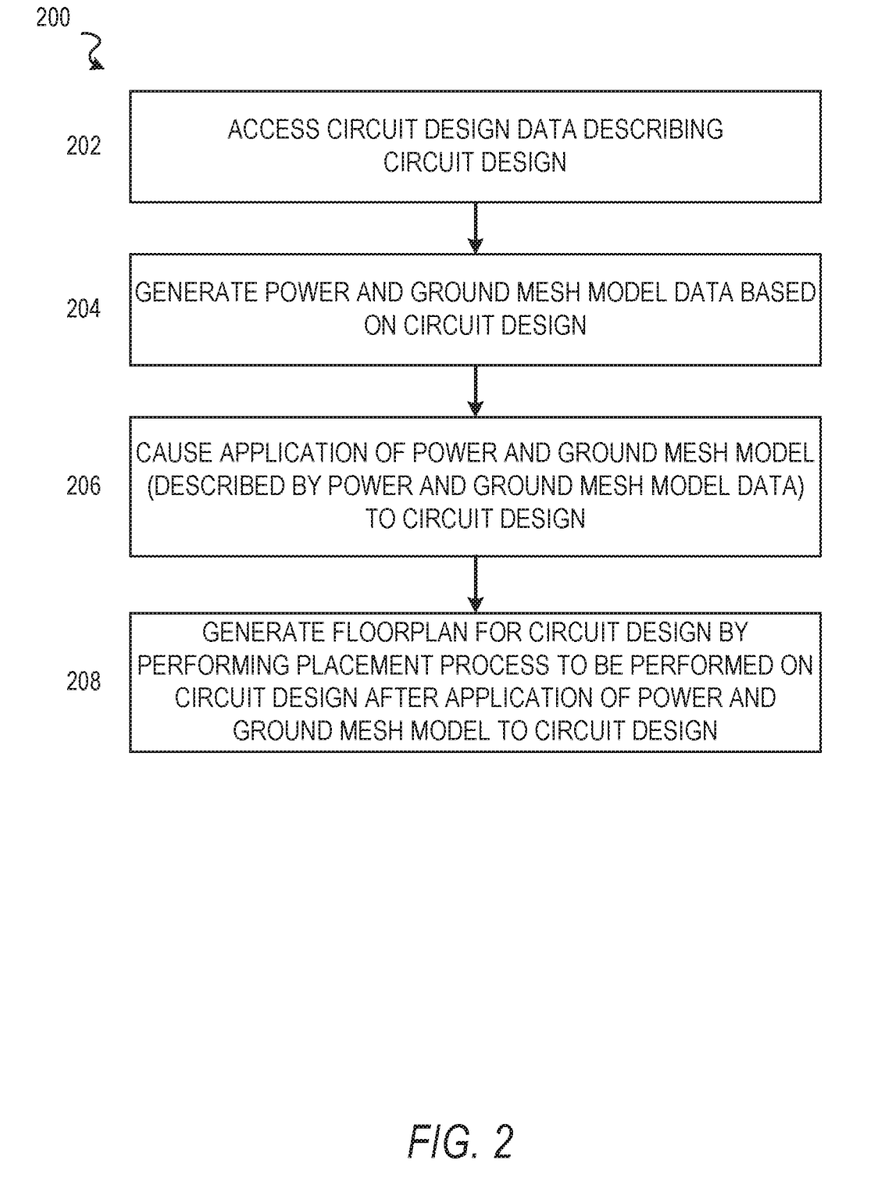
FIGS. 2 and 3 are flowcharts illustrating example methods for placement with PG mesh modeling, according to some embodiments.
Figure 3:
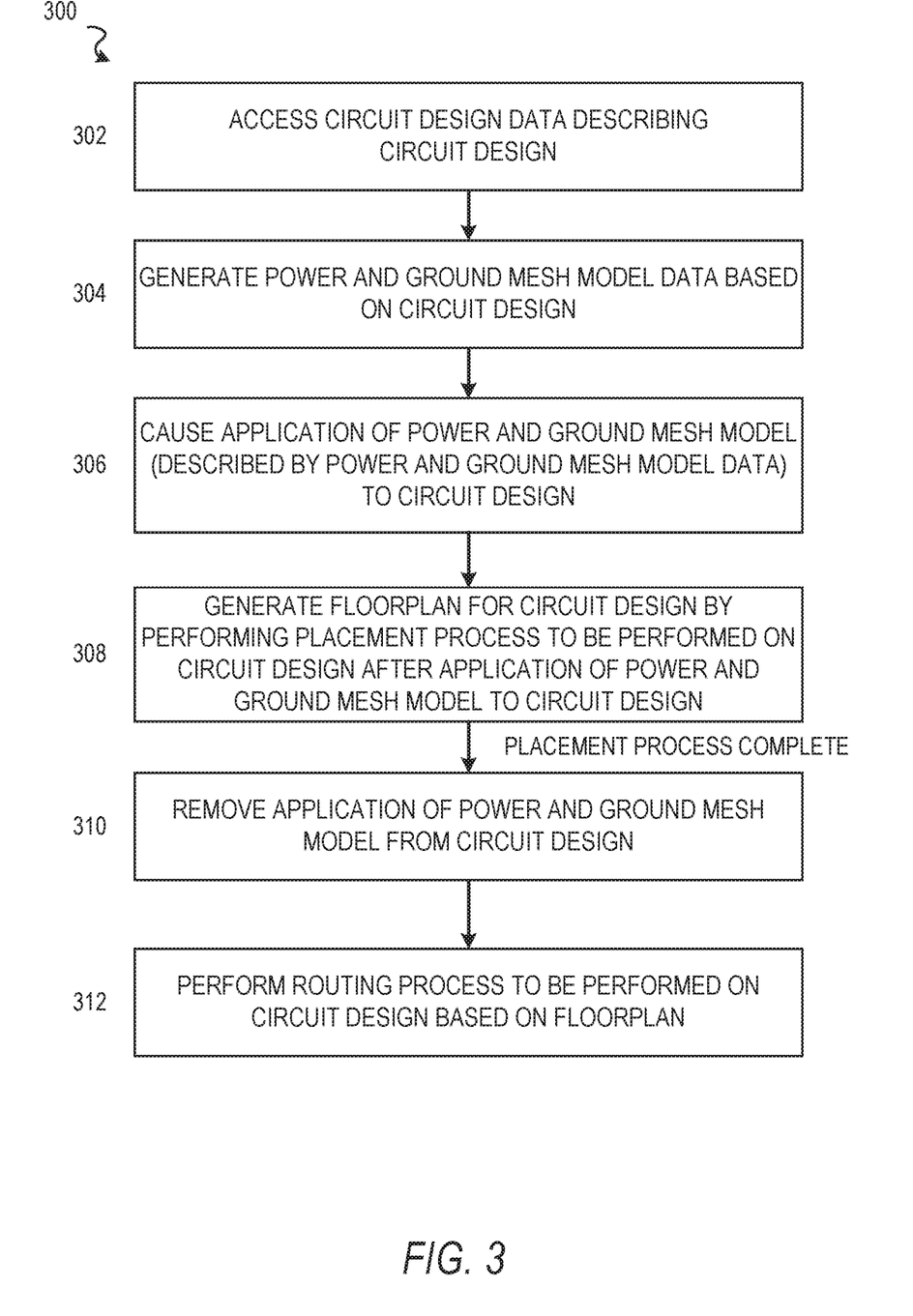

FIGS. 2 and 3 are flowcharts illustrating example methods 200, 300 for placement with PG mesh modeling, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to FIG. 2, the flowchart illustrates the example method 200 for placing circuit elements (e.g., standard cells or macros) within a circuit design based on a PG mesh model, according to some embodiments. For some embodiments, the method 200 is performed as part of a placement flow with respect to a circuit design (e.g., by an EDA software system). An operation of the method 200 (or another method described herein) may be performed by a hardware processor (e.g., central processing unit or graphics processing unit) of a computing device (e.g., desktop, server, etc.).

The method 200 as illustrated begins with operation 202 accessing circuit design data describing a circuit design. The method 200 continues with operation 204 generating power and ground mesh model data based on the circuit design data, where the power and ground mesh model data describes a power and ground mesh model for the circuit design.

For some embodiments, generating the power and ground mesh model data based on the circuit design data comprises generating the power and ground mesh model data based on a reference power and ground mesh previously generated for the circuit design. As noted herein, the reference power and ground mesh may be one generated using a script (e.g., a customer's PG routing script). According to various embodiments, the power and ground mesh model is extracted from the reference power and ground mesh.

To generate the power and ground mesh model, some embodiments can determine a set of estimated routing resources occupied by the reference power and ground mesh for the circuit design (e.g., occupied by the reference PG mesh for each macro and standard cell of the circuit design). The following is an example expression of the estimated routing resources occupied for specific metal layers by percentages: {M1 0.07 M2 0.15 M3 0.02 M4 0.02 M5 0.1 M6 0.1 M7 0.03 M8 0.02}. Application of the power and ground mesh model to the circuit design can comprise rendering the set of estimated routing resources unavailable (e.g., removed, blocked, occupied) in the circuit design. Depending on the embodiment, rendering the set of estimated routing resources unavailable in the circuit design can comprise removing a portion of routing tracks from a supply of routing tracks available for the metal layer of the circuit design, where the portion of routing tracks removed is based on the set of estimated routing resources. As noted herein, the set of estimated routing resources can comprise a set of routing tracks on a metal layer of the circuit design (e.g., a metal layer above and a metal layer below a standard cell or a macro).

Alternatively, generation of the power and ground mesh model data for a portion of the power and ground mesh corresponding to a standard cell can differ from generation of the power and ground mesh model data for a portion of the power and ground mesh corresponding to a macro. For instance, with respect to macros, generating the power and ground mesh model data based on the circuit design data can comprise determining (e.g., identifying) a portion of the reference power and ground mesh corresponding to a given macro of the circuit design. Application of the power and ground mesh model to the circuit design can comprise adding a metal cell obstruction to a metal layer of the circuit design, where the metal cell obstruction corresponds to the portion of the reference power and ground mesh. With respect to standard cells, generating the power and ground mesh model data based on the circuit design data can comprise determining a portion of a reference power and ground mesh corresponding to a given standard cell of the circuit design, and determining a set of estimated routing resources occupied by the portion of the reference power and ground mesh. Application of the power and ground mesh model to the circuit design can comprise rendering the set of estimated routing resources unavailable (e.g., removed, blocked, occupied) in the circuit design.

The method 200 continues with operation 206 causing an application of the power and ground mesh model to the circuit design based on the power and ground mesh model data. For some embodiments, operation 206 is performed prior to a placement process being performed on the circuit design.

The method 200 continues with operation 208 generating a floorplan for the circuit design by performing a placement process to be performed on the circuit design after the application of the power and ground mesh model to the circuit design by operation 206. For some embodiments, the placement process comprises a mixed-placement process that concurrently places at least one standard cell of the circuit design and at least one macro of the circuit design. Based on the application of the power and ground mesh model (by operation 206), the placement process can place a standard cell or a macro on the floorplan based on routing congestion determined (e.g., estimated) by the placement process based on the supply of routing tracks available for the metal layer of the circuit design.

Referring now to FIG. 3, the flowchart illustrates the example method 300 for placing circuit elements within a circuit design based on a PG mesh model, according to some embodiments. Like the method 200 of FIG. 2, the method 300 can be performed as part of a placement flow with respect to a circuit design. An operation of the method 300 (or another method described herein) may be performed by a hardware processor (e.g., central processing unit or graphics processing unit) of a computing device (e.g., desktop, server, etc.).

The method 300 begins with operations 302 through 308, which according to some embodiments are respectively similar to operations 202 through 208 of the method 200 described above with respect to FIG. 2.

The method 300 continues with operation 310 removing the application of the power and ground mesh model (by operation 306) from the circuit design after the placement process (caused by operation 308) has completed. For instance, where a set of estimated routing resources are rendered unavailable (by operation 306) to apply the power and ground mesh model to the circuit design, removing the application of the power and ground mesh model from the circuit design can comprise rendering the set of estimated routing resources available in the circuit design. Where a metal cell obstruction is added to a metal layer of the circuit design (by operation 306) to apply the power and ground mesh model to the circuit design, removing the application of the power and ground mesh model from the circuit design can comprise removing the metal cell obstruction from the metal layer of the circuit design.

The method 300 continues with operation 312 performing a routing process to be performed on the circuit design based on the floorplan (generated by operation 308) after removal of the application of the power and ground mesh model from the circuit design (by operation 310).

Figure 4:
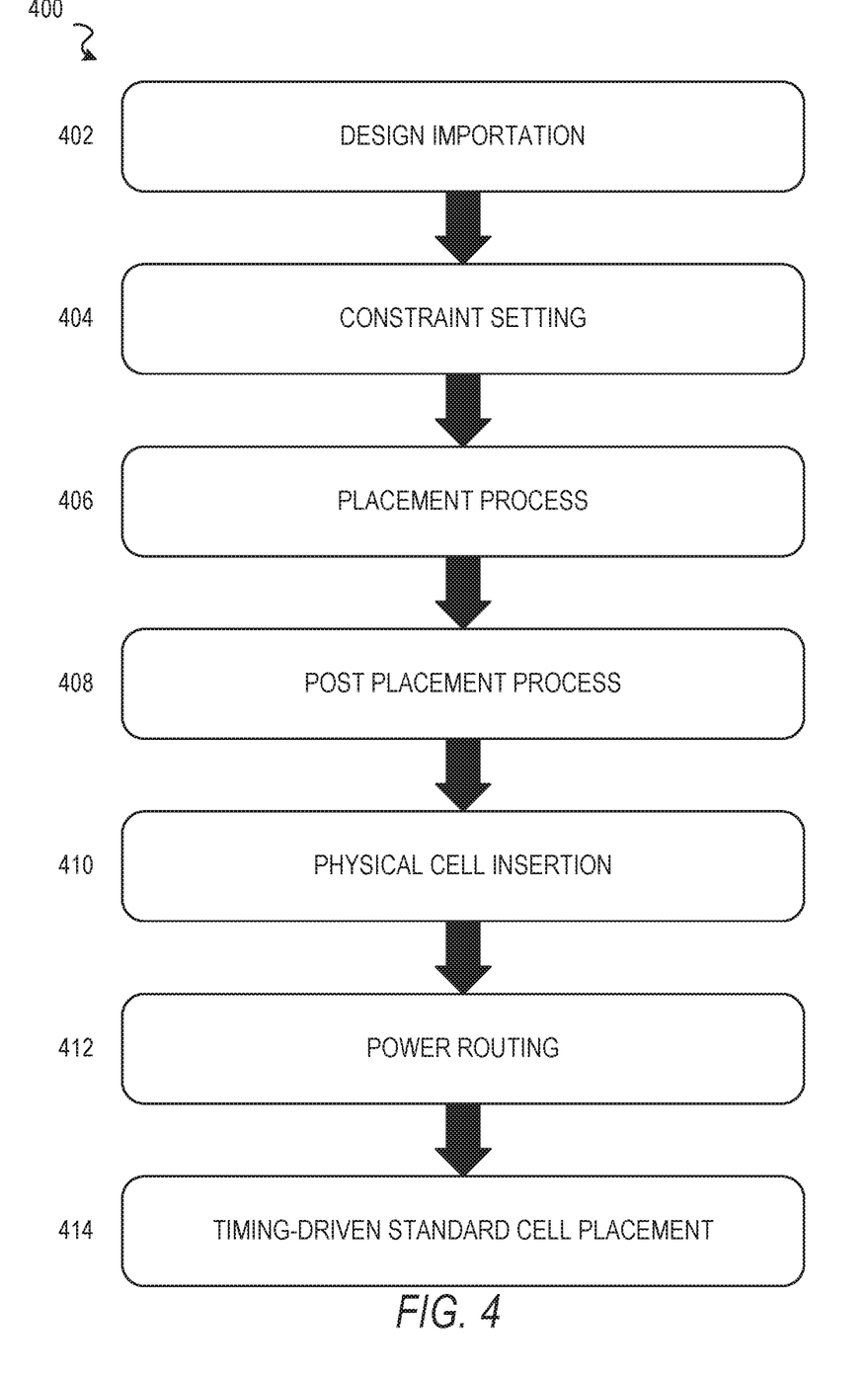
FIG. 4 is a flowchart illustrating an example placement flow with power and ground mesh modeling, according to some embodiments.

FIG. 4 is a flowchart illustrating an example placement flow 400 with power and ground mesh modeling, according to some embodiments. For some embodiments, the placement flow 400 uses or implements one or more methods described herein (e.g., method 200 or 300). Additionally, for some embodiments, at least some portions of the placement flow 400 is implemented by an EDA.

As shown, the placement flow 400 starts with operation 402, where a circuit design is imported into the placement flow 400. For some embodiments, operation 402 comprises accessing circuit design data that describes the circuit design as generated based on a prior circuit design stage (e.g., design input 112 as described with respect to FIG. 1). The circuit design data accessed by operation 402 can comprise a netlist, which can describe circuit blocks, logic cells within the blocks, and the connections between those logic cells.

The placement flow 400 continues with operation 404, with the setting of one or more circuit design constraints (hereafter, constraints) for the circuit design. Operation 404 can comprise setting floorplanning constraints, such as defining instance groups, fixing analog macros, adding halos to macros, and adding placement blockages. Operation 404 can comprise setting placement constraints, such as setting timing constraints (e.g., path group setting), and setting different modes for the placement flow 400 (e.g., placement mode, optimization mode, routing mode). Additionally, for some embodiments, operation 404 comprises generating a power and ground mesh model and applying the generated power and ground mesh model to the circuit design, as described herein.

At operation 406, the placement flow 400 continues by performing a placement process on the circuit design (described by the data imported by operation 402) based on the constraints (as set by operation 404). Depending on the embodiment, the placement process performed can comprise a mixed-placement process, which can concurrently place at least one standard cell and at least one macro of the circuit design. The mixed-placement process can place the at least one standard cells and the at least one macro while honoring the one or more constraints set by operation 404.

The placement flow 400 continues with operation 408, where a post-placement process is performed. The post-placement process can comprise implementing one or more macro fixes (as necessary), and can add placement and routing blockages. For some embodiments, the post-placement process comprises removing at least some portion of the power and ground mesh model applied at operation 404.

Operation 410 of the placement flow 400 comprises insertion of one or more physical cells into the circuit design. Depending on the embodiment, operation 410 can comprise adding one or more end caps, taps, and power switches.

At operation 412, the placement flow 400 continues by routing power to one or more elements of the circuit design. For some embodiments, a real power and ground mesh is generated and added to the circuit design. Additionally, operation 412 can comprise adding one or more pins, power stripes, and power vias.

The placement flow 400 continues with operation 414, where time-driving standard cell placement is performed. Depending on the embodiment, the time-driving standard cell placement can comprise timing driven incremental standard cell placement and pre-clock tree synthesis (CTS) optimization. The floorplan resulting at the conclusion of the placement flow 400 can be further processed by the next stage of circuit design, which can comprise performing a routing process on the circuit design based on the resulting floorplan.

Figure 5:
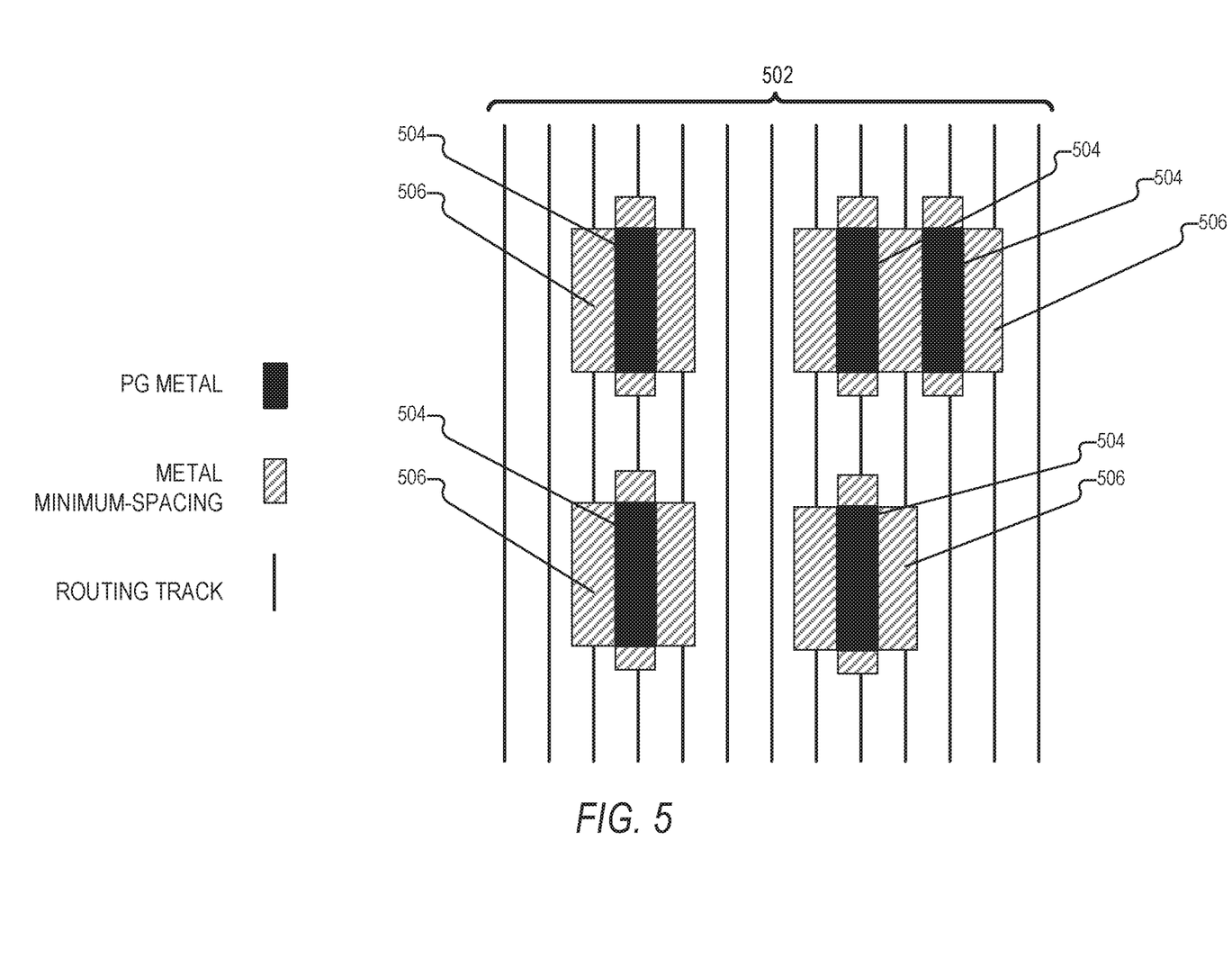
FIG. 5 is a diagram illustrating an example of portions of a power and ground mesh occupying routing tracks on a metal layer of a circuit design, according to some embodiments.

FIG. 5 is a diagram illustrating an example of portions of a power and ground (PG) mesh occupying routing tracks 502 on a metal layer of a circuit design, according to some embodiments. For some embodiments, the routing tracks represent those present within a bin (e.g., grid cell) of the metal layer of the circuit design. The power and ground mesh comprises a plurality of PG metal portions 504, and based on design constraints, each of PG metal portions 504 is surrounded by metal minimum spacing 506 around the metal. As shown, the PG metal portions 504 and the minimum spacing 506 occupy portions of routing tracks. For some embodiments, where the PG mesh comprises a reference PG mesh, the amount of routing length occupied by the PG metal portions 504 and the minimum spacing 506 are determined and used to determine the routing track utilization ratio by the reference PG mesh, as described herein.

Figure 6:
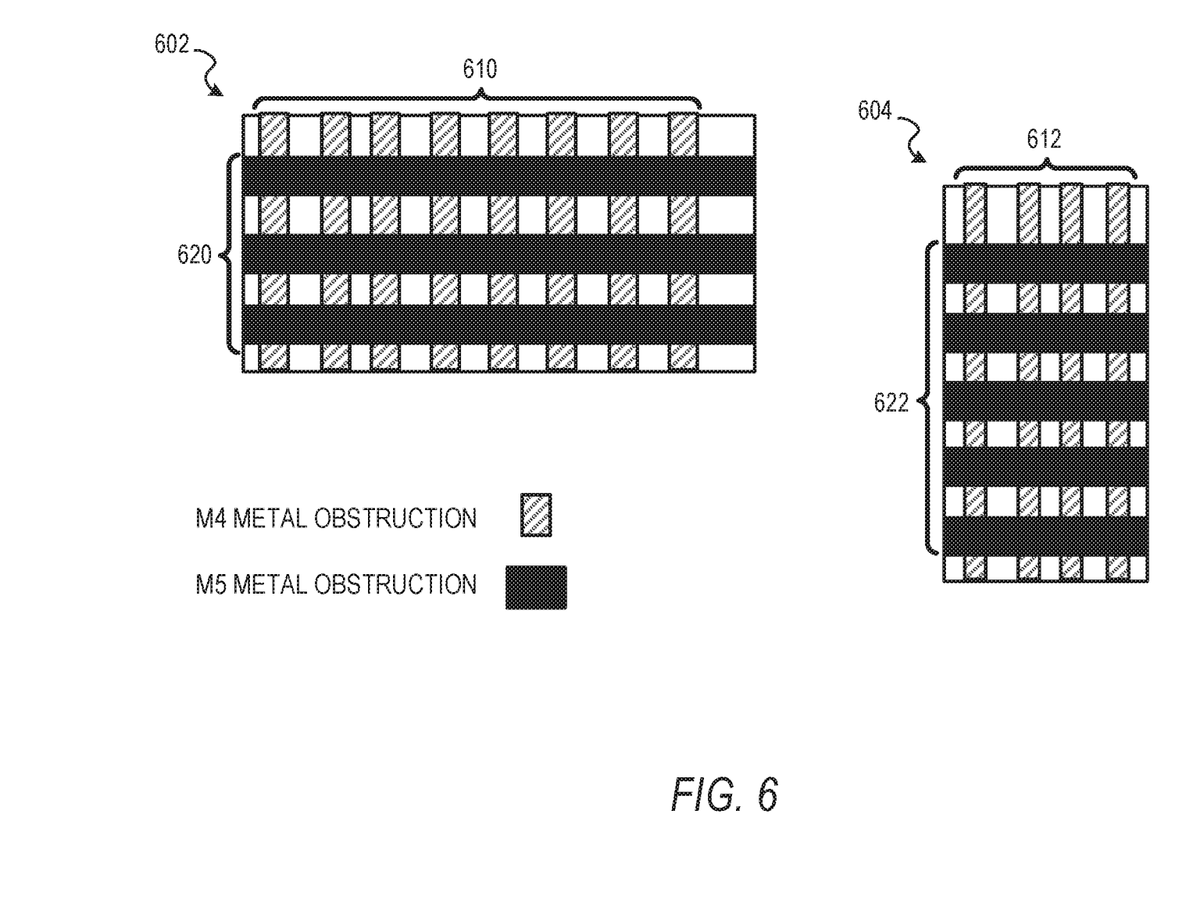
FIG. 6 is a diagram illustrating examples of metal obstructions added to metal layers of a circuit design, according to some embodiments.

FIG. 6 is a diagram illustrating examples of metal obstructions 610, 612, 620, 622 added to metal layers of a circuit design, according to some embodiments. According to various embodiments, the metal obstructions 610, 612, 620, 622 are added to the circuit design to model portions of a power and ground mesh that correspond to macros 602 and 604 of the circuit design. The macros 602, 604 may represent, for example, circuit elements for a read access memory (RAM) or a read-only memory (ROM). With respect to macro 602, vertical metal obstructions 610 are added to metal layer M4 of the circuit design, while horizontal metal obstructions 620 are added to metal layer M5 of the circuit design. With respect to macro 604, vertical metal obstructions 612 are added to metal layer M4 of the circuit design, while horizontal metal obstructions 622 are added to metal layer M5 of the circuit design. Metal layer M4 can represent the metal layer disposed below the macros 602, 604, and metal layer M5 can represent the metal layer disposed above the macros 602, 604. The vertical metal obstructions 610, 612 can have a width (0.6) and pitch (0.5) that differs from the horizontal metal obstructions 620, 622 (e.g., width of 0.5 and pitch of 0.7).

Figure 7:
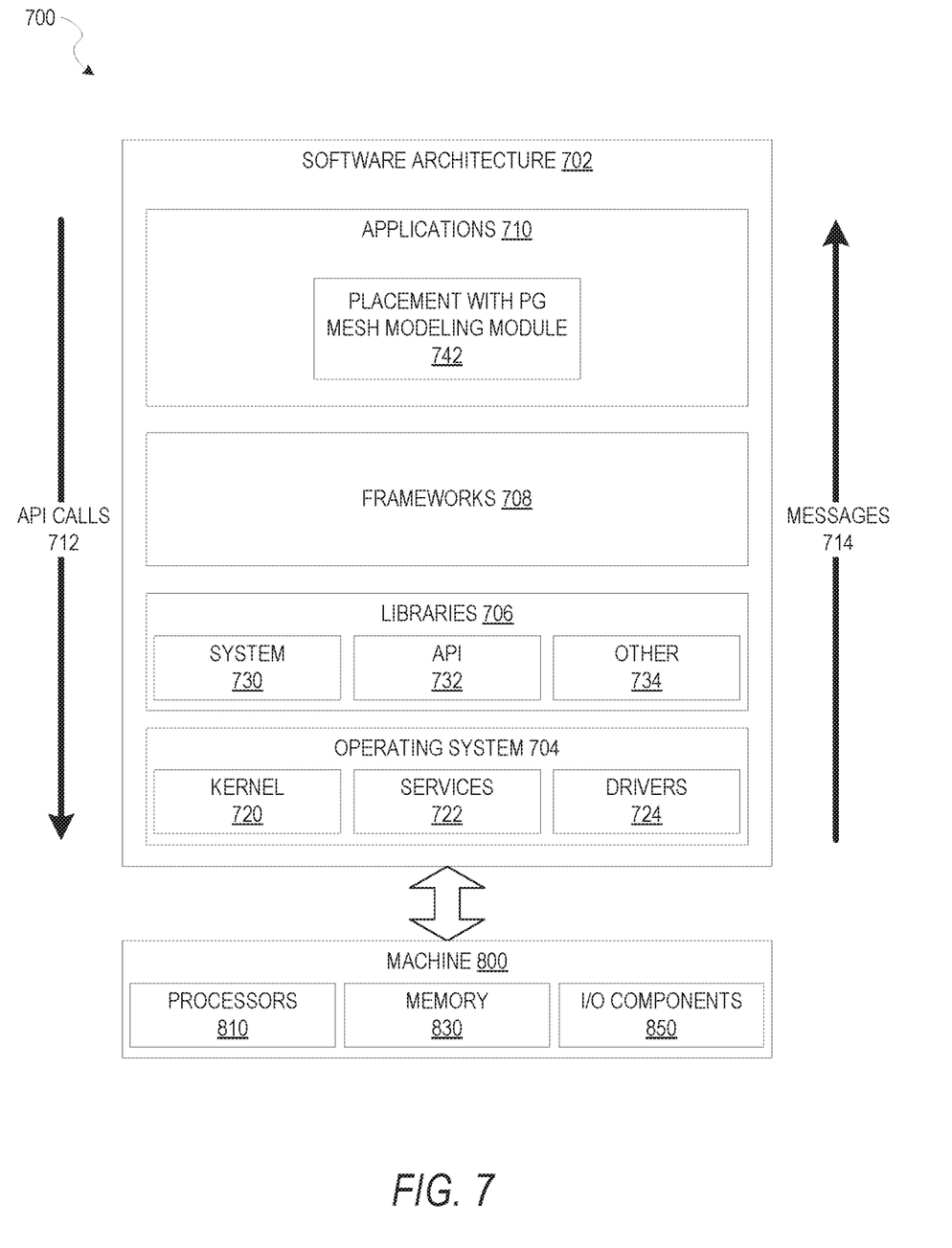
FIG. 7 is a block diagram illustrating an example of a software architecture that may be operating on an EDA computing device and may be used with methods for placement with PG mesh modeling, according to some embodiments.

FIG. 7 is a block diagram 700 illustrating an example of a software architecture 702 that may be operating on an EDA computer and may be used with methods for placement with PG mesh modeling, according to some embodiments. The software architecture 702 can be used as an EDA computing device to implement any of the methods described above. Aspects of the software architecture 702 may, in various embodiments, be used to store circuit designs, and to facilitate generation of a circuit design in an EDA environment by performing placement with PG mesh modeling.

FIG. 7 is merely a non-limiting example of a software architecture 702, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example, the software architecture 702 can be conceptualized as a stack of layers where each layer may provide a particular functionality. For example, the software architecture 702 includes layers such as an operating system 704, libraries 706, software frameworks 708, and applications 710. Operationally, the applications 710 invoke application programming interface (API) calls 712 through the software stack and receive messages 714 in response to the API calls 712, consistent with some embodiments. In various embodiments, any client device, any server computer of a server system, or any other device described herein may operate using elements of the software architecture 702. An EDA computing device described herein may additionally be implemented using aspects of the software architecture 702, with the software architecture 702 adapted for operating to circuit design routing in any manner described herein.

Figure 8:
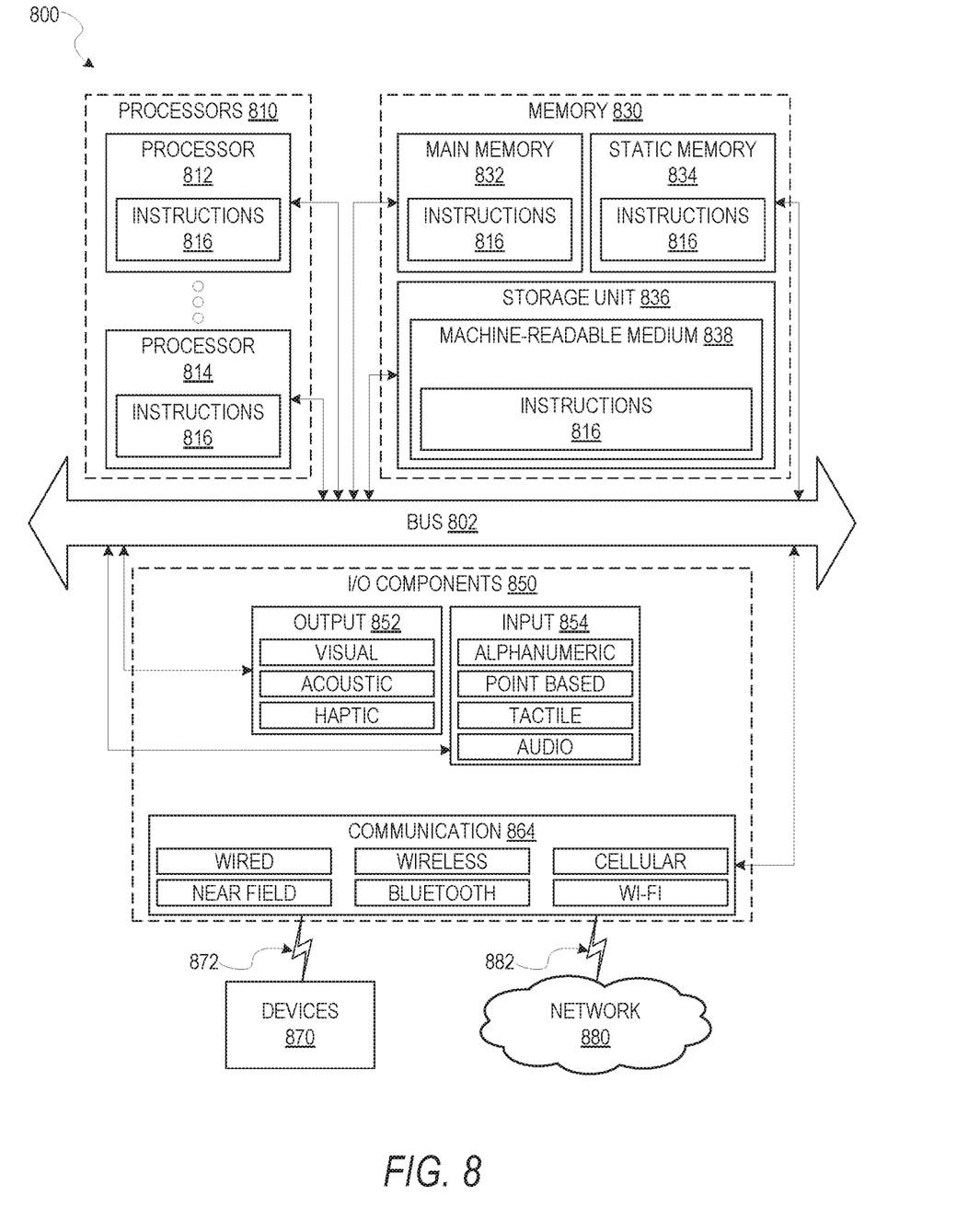
FIG. 8 is a diagram representing a machine in the form of a computer system within which a set of instructions are executed, causing the machine to perform any one or more of the methods discussed herein, according to some embodiments.

In some embodiments, an EDA application of the applications 710 performs circuit design routing according to embodiments described herein using various modules within the software architecture 702. For example, in some embodiments, an EDA computing device similar to the machine 800 includes the memory 830 and the one or more processors 810. The processors 810 also implement a placement with power and ground mesh modeling module 742 (hereafter, the placement with PG mesh modeling module 742) for placement using PG mesh modeling, in accordance with various embodiments described herein.

In various other embodiments, rather than being implemented as modules of the one or more applications 710, the placement with PG mesh modeling module 742 may be implemented using elements of the libraries 706, the operating system 704, or the software frameworks 708.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 such as libraries of blocks for use in an EDA environment or other libraries that can provide functions such as memory allocation functions, string manipulation functions, mathematic functions, and the like. In addition, the libraries 706 can include API libraries 732 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 706 may also include other libraries 734.

The software frameworks 708 provide a high-level common infrastructure that can be utilized by the applications 710, according to some embodiments. For example, the software frameworks 708 provide various graphic user interface (GUI) functions, high-level resource management, high-level location services, and so forth. The software frameworks 708 can provide a broad spectrum of other APIs that can be utilized by the applications 710, some of which may be specific to a particular operating system 704 or platform. In various embodiments, the systems, methods, devices, and instructions described herein may use various files, macros, libraries, and other elements of an EDA design environment to implement placement with PG mesh modeling as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 702, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 800 including processors 810), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 800, but deployed across a number of machines 800. In some embodiments, the processors 810 or processor-implemented modules are located in a single geographic location (e.g., within a home environment, an office environment, or a server farm). In some other embodiments, the processors or processor-implemented modules are distributed across a number of geographic locations.

FIG. 8 is a diagrammatic representation of the machine 800 in the form of a computer system within which a set of instructions may be executed for causing the machine 800 to perform any one or more of the methodologies discussed herein, according to some embodiments. FIG. 8 shows components of the machine 800, which is, according to some embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein can be executed. In alternative embodiments, the machine 800 operates as a standalone device or can be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and I/O components 850, which can be configured to communicate with each other via a bus 802. In some embodiments, the processors 810 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute the instructions 816 contemporaneously. Although FIG. 8 shows multiple processors 810, the machine 800 may include a single processor 812 with a single core, a single processor 812 with multiple cores (e.g., a multi-core processor 812), multiple processors 810 with a single core, multiple processors 810 with multiple cores, or any combination thereof.

The memory 830 comprises a main memory 832, a static memory 834, and a storage unit 836 accessible to the processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory.

While the machine-readable medium 838 is shown, in some embodiments, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., the instructions 816) for execution by a machine (e.g., the machine 800), such that the instructions, when executed by one or more processors of the machine (e.g., the processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various embodiments, the I/O components 850 include output components 852 and input components 854. The output components 852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, the communication components 864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 870 may be another machine or any of a wide variety of peripheral devices (e.g., a peripheral device coupled via a USB).

In various embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling.

Furthermore, the machine-readable medium 838 is non-transitory (in other words, not having any transitory signals) in that it does not embody a propagating signal. However, labeling the machine-readable medium 838 "non-transitory" should not be construed to mean that the machine-readable medium 838 is incapable of movement, the machine-readable medium 838 should be considered as being transportable from one physical location to another. Additionally, since the machine-readable medium 838 is tangible, the machine-readable medium 838 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to some embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
accessing, by a hardware processor, circuit design data that describes a circuit design;
generating, by the hardware processor, power and ground mesh model data based on the circuit design data, the power and ground mesh model data describing a power and ground mesh model for the circuit design;
causing, by the hardware processor, an application of the power and ground mesh model to the circuit design based on the power and ground mesh model data, the generating the power and ground mesh model data and the application of the power and ground mesh model to the circuit design comprising at least one of:
determining a set of estimated routing resources occupied by a reference power and ground mesh for the circuit design, and rendering the set of estimated routing resources unavailable in the circuit design; or
determining a portion of the reference power and ground mesh corresponding to a given macro of the circuit design, and adding a metal cell obstruction to a metal layer of the circuit design, the metal cell obstruction corresponding to the portion of the reference power and ground mesh;
generating, by the hardware processor, a floorplan for the circuit design by performing a placement process to be performed on the circuit design after the application of the power and ground mesh model to the circuit design;
after the placement process has completed, removing, by the hardware processor, the application of the power and ground mesh model from the circuit design; and after the application of the power and ground mesh model is removed from the circuit design, performing, by the hardware processor, a routing process to be performed on the circuit design based on the floorplan.

2. The method of claim 1, wherein the generating the power and ground mesh model data based on the circuit design data comprises:
generating the power and ground mesh model data based on a reference power and ground mesh previously generated for the circuit design.

3. The method of claim 1, wherein the set of estimated routing resources comprises a set of routing tracks of a metal layer of the circuit design.

4. The method of claim 3, wherein the rendering the set of estimated routing resources unavailable in the circuit design comprises:
removing a portion of routing tracks from a supply of routing tracks available for the metal layer of the circuit design, the portion of routing tracks being based on the set of estimated routing resources.

5. The method of claim 4, wherein the placement process places at least one of a standard cell or a macro on the floorplan based on routing congestion, the routing congestion being determined by the placement process based on the supply of routing tracks available for the metal layer of the circuit design.

6. The method of claim 1, wherein the removing the application of the power and ground mesh model from the circuit design comprises:
rendering the set of estimated routing resources available in the circuit design.

7. The method of claim 1, wherein the placement process comprises a mixed-placement process that concurrently places at least one standard cell of the circuit design and at least one macro of the circuit design.

8. The method of claim 1, wherein the removing the application of the power and ground mesh model from the circuit design comprises:
removing the metal cell obstruction from the metal layer of the circuit design.

9. The method of claim 1, wherein the application of the power and ground mesh model to the circuit design further comprises:
determining a portion of a reference power and ground mesh corresponding to a given standard cell of the circuit design; and
determining a set of estimated routing resources occupied by the portion of the reference power and ground mesh, the application of the power and ground mesh model to the circuit design comprising rendering the set of estimated routing resources unavailable in the circuit design.

10. The method of claim 9, wherein the removing the application of the power and ground mesh model from the circuit design comprises:
rendering the set of estimated routing resources available in the circuit design.

11. A device comprising:
a memory storing instructions; and
a hardware processor communicatively coupled to the memory and configured by the instructions to perform operations comprising:
accessing circuit design data that describes a circuit design;
generating power and ground mesh model data based on reference power and ground mesh data and the circuit design data, the power and ground mesh model data describing a power and ground mesh model for the circuit design, the reference power and ground mesh data describing a reference power and ground mesh previously generated for the circuit design;
causing an application of the power and ground mesh model to the circuit design based on the power and ground mesh model data, the generating the power and ground mesh model data and the application of the power and ground mesh model to the circuit design comprising at least one of:
determining a set of estimated routing resources occupied by a reference power and ground mesh for the circuit design, and rendering the set of estimated routing resources unavailable in the circuit design; or
determining a portion of the reference power and ground mesh corresponding to a given macro of the circuit design, and adding a metal cell obstruction to a metal layer of the circuit design, the metal cell obstruction corresponding to the portion of the reference power and ground mesh; and
generating a floorplan for the circuit design by performing a placement process to be performed on the circuit design after the application of the power and ground mesh model to the circuit design.

12. The device of claim 11, wherein the operations further comprise:
after the placement process has completed, removing the application of the power and ground mesh model from the circuit design; and
after the application of the power and ground mesh model is removed from the circuit design, performing a routing process to be performed on the circuit design based on the floorplan.

13. The device of claim 11, wherein the set of estimated routing resources comprises a set of routing tracks of a metal layer of the circuit design, and the rendering the set of estimated routing resources unavailable in the circuit design comprises:
removing a portion of routing tracks from a supply of routing tracks available for the metal layer of the circuit design, the portion of routing tracks being based on the set of estimated routing resources.

14. The device of claim 13, wherein the placement process places at least one of a standard cell or a macro on the floorplan based on routing congestion, the routing congestion being determined by the placement process based on the supply of routing tracks available for the metal layer of the circuit design.

15. The device of claim 11, wherein the application of the power and ground mesh model to the circuit design further comprises:
determining a portion of a reference power and ground mesh corresponding to a given standard cell of the circuit design; and
determining a set of estimated routing resources occupied by the portion of the reference power and ground mesh, the application of the power and ground mesh model to the circuit design comprising rendering the set of estimated routing resources unavailable in the circuit design.

16. A non-transitory computer-readable medium comprising instructions that, when executed by a hardware processor of a device, cause the device to perform operations comprising:

accessing circuit design data that describes a circuit design;

generating power and ground mesh model data based on the circuit design data, the power and ground mesh model data describing a power and ground mesh model for the circuit design; causing an application of the power and ground mesh model to the circuit design based on the power and ground mesh model data, the generating the power and ground mesh model data and the application of the power and ground mesh model to the circuit design comprising at least one of:

determining a set of estimated routing resources occupied by a reference power and ground mesh for the circuit design, and rendering the set of estimated routing resources unavailable in the circuit design; or determining a portion of the reference power and ground mesh corresponding to a given macro of the circuit design, and adding a metal cell obstruction to a metal layer of the circuit design, the metal cell obstruction corresponding to the portion of the reference power and ground mesh; and generating a floorplan for the circuit design by performing a placement process to be performed on the circuit design after the application of the power and ground mesh model to the circuit design.

17. The non-transitory computer-readable medium of claim 16, wherein the set of estimated routing resources comprises a set of routing tracks of a metal layer of the circuit design.

18. The non-transitory computer-readable medium of claim 16, wherein the operations further comprise:

after the placement process has completed, removing, by the hardware processor, the application of the power and ground mesh model from the circuit design, the removing the application of the power and ground mesh model from the circuit design comprises:

rendering the set of estimated routing resources available in the circuit design.

19. The non-transitory computer-readable medium of claim 16, wherein the operations further comprise:

after the placement process has completed, removing, by the hardware processor, the application of the power and ground mesh model from the circuit design, the removing the application of the power and ground mesh model from the circuit design comprises:

removing the metal cell obstruction from the metal layer of the circuit design.

20. The non-transitory computer-readable medium of claim 16, wherein the application of the power and ground mesh model to the circuit design further comprises:

determining a portion of a reference power and ground mesh corresponding to a given standard cell of the circuit design; and determining a set of estimated routing resources occupied by the portion of the reference power and ground mesh, the application of the power and ground mesh model to the circuit design comprising rendering the set of estimated routing resources unavailable in the circuit design.

* * * * *